United States Patent [19]
Atherton et al.

[11] Patent Number: 5,469,153
[45] Date of Patent: Nov. 21, 1995

[54] METHOD OF SERIALLY PROCESSING BINARY CHARACTERS ASYNCHRONOUSLY RECEIVED BY AN ELECTRICAL ENERGY METER

[75] Inventors: Kenneth W. Atherton, Saco; Kevin P. Grogan, South Berwick, both of Me.; Richard A. Balch, North Hampton; Mark J. Plis, Barrington, both of N.H.

[73] Assignee: General Electric Company, Schenectady, N.Y.

[21] Appl. No.: 968,948

[22] Filed: Oct. 30, 1992

[51] Int. Cl.$^6$ .......................... G08C 17/00; G08B 29/00
[52] U.S. Cl. ................................. 340/870.28; 340/870.02
[58] Field of Search ...................... 340/870.07, 870.02, 340/870.07, 870.28, 825.54, 825.2; 359/109, 143

[56] References Cited

U.S. PATENT DOCUMENTS

| | | | |
|---|---|---|---|
| 3,702,460 | 11/1972 | Blose | 340/150 |
| 4,190,800 | 2/1980 | Kelly, Jr. et al. | 325/37 |
| 4,204,195 | 5/1980 | Bogacki | 340/151 |
| 4,298,839 | 11/1981 | Johnston | 324/157 |
| 4,525,785 | 6/1985 | Soderberg | 364/464 |
| 4,621,330 | 11/1986 | Weikel | 364/483 |
| 4,749,992 | 6/1988 | Fitzemeyer et al. | 340/870.02 |

OTHER PUBLICATIONS

NEC Electronics, Inc., uPD75104/75106, Application Note 11, Apr., 1987 (pp. 69–92).
NEC Electronics Inc., uPD7530X/31x 4 Bit Microconti-perter On–Chip Peripheral, Application Note, Nov., 1989 (pp. 9–28–9–51).

*Primary Examiner*—Michael T. Razavi
*Assistant Examiner*—Tuan V. Ho
*Attorney, Agent, or Firm*—Bell, Seltzer, Park & Gibson

[57] ABSTRACT

A method of processing binary characters received by an electrical energy meter includes the step of generating a clock signal internal to the meter so that asynchronously received serial data can be processed, even though a synchronization clock signal does not accompany the serial data. The method includes the steps of detecting receipt of a first of a string of binary input characters at a serial input/output port of the meter, and then sampling the detected first character by generating a respective first clock signal which is phase-synchronized with a least significant bit of the first character. These steps are then repeated in sequence for each subsequently received character in the string. The sampled characters can be temporarily stored in meter hardware such as a register and written to memory such as programmable read-only or random-access memory. Phase-synchronization between the sampling clock signals and each of the respective characters is achieved even though the data rate of the binary string (e.g., 9600 bits/sec) is unequal to an integer fraction of the frequency of the main crystal oscillator of the meter (e.g., 4.19 MHz), which controls meter operations.

7 Claims, 8 Drawing Sheets

METHOD OF SERIALLY PROCESSING BINARY CHARACTERS ASYNCHRONOUSLY RECEIVED BY AN ELECTRICAL ENERGY METER

I. BACKGROUND OF THE INVENTION

A. Field of the Invention

The present invention relates to programming microcontroller-based systems, and more particularly, relates to utilizing the synchronous serial port of an energy meter microcontroller for asynchronous communication so as to increase the rate of re-programming.

B. Related Art

With respect to the energy metering art, the advantages of asynchronous communications over synchronous communications are well known. In addition, the cost to add hardware for asynchronous communications ability to a microcontroller initially having only synchronous communication ability typically are high as compared to the overall cost of an energy meter. Providing the advantages of asynchronous communication without such hardware costs is desirable.

In addition, with respect to the energy metering art, reducing the amount of time to re-program meter registers is highly desirable. Particularly, the meter reader who re-programs a meter register in the field will have lower productivity if re-programming meter registers requires a greater amount of time. Also, temporary accumulators are required to hold energy consumption information acquired during programming but which information cannot be processed until the programming has been completed. As the amount of time required to re-program increases, the necessary size of the accumulators also increases. Moreover, the accumulators occupy memory space that could otherwise be used for providing other features. If the temporary accumulators become too large, an external memory may have to be added. External memory adds more costs to the meter.

Known art includes GE's TM900 register which utilizes an NEC 75312 processor in conjunction with a synchronous optical communication protocol. With respect to programming time, and by way of example, the time required to transmit security code in such register during reprogramming is about 1.33 seconds. For registers with universal asynchronous receivers/transmitters (UARTS), such as GE's Phase3 register, security code transmission requires only 0.01 seconds. UARTS, however, add cost to the register.

It is also known to utilize a synchronous serial port for asynchronous communications in a low cost processor utilized in electronic metering applications. An example of such a scheme is described in NEC Electronics Inc.'s uPD75104/75106 Application Note 11, April 1987. The approach described in NEC's application note is limited to a maximum of 4800 BPS for the NEC 753XX family of processors. Other approaches to handle asynchronous communications require bit-toggling of the port under program control and place a greater limit on the amount of processing that can be done during communication.

Most asynchronous communications standards and support software for electronic metering require a minimum of 9600 BPS. In addition, with respect to the metering art, it is desirable to avoid limiting, to the extent possible, the amount of processing performed during communications. Moreover, and importantly, saving the utilities the added cost of having to purchase a UART is highly desirable. There is a need, therefore, for a method and apparatus which provides 9600 BPS communication without requiring additional hardware and which does not monopolize microcontroller time so as to avoid limiting registration of energy consumption.

II. SUMMARY OF THE INVENTION

One embodiment of the present invention is a method for operating, in an asynchronous manner, a microcontroller configured for synchronous communication. The method can be represented in algorithm form, which algorithm is embodied in firmware and utilized to control operations of the microcontroller.

More particularly, when the microcontroller is operating in the receiving mode, and once the leading edge of a character is received, the character is checked for a start bit. If the start bit is detected, then the internal clock of the processor is synchronized with the center of incoming bits. Specifically, the start bit is skipped over and a data bit is "clocked in" on the rising edge of the internal serial clock. The bit is then loaded into a shift register and read into a memory location from the shift register. Once eight (8) bits and the stop bit are "clocked in", the microprocessor then returns to monitoring for a start bit of another character. The stop bit is framed, i.e., measured, to facilitate proper character identification. In the transmitting mode, a start bit is transmitted (or "forced out) on the serial out line. The character to be transmitted is then loaded into the shift register from memory and the internal clock is synchronized with the center of outgoing bits. All eight (8) bits are transmitted in this manner and once complete, the serial out line is disposed in the "mark state". After "one stop bit time" has elapsed, i.e., character bit framing, another character can be transmitted. Such character framing facilitates proper character identification.

The foregoing summary relates to serial communication of eight (8) bit characters. It should be understood, of course, that more than eight (8) bit or less than eight (8) bit characters could be utilized. The present invention provides a 9600 BPS communication rate and does not substantially limit the amount of other processing that can be performed by the microcontroller during communication. Moreover, and importantly, the present invention saves the utilities the added cost of having to purchase a UART.

III. BRIEF DESCRIPTION OF THE DRAWINGS

These and other objects of the present invention, together with further features and advantages thereof, will become apparent from the following detailed specification when read together with the accompanying drawings, in which.

IV. DETAILED DESCRIPTION OF THE DRAWINGS

Figure 1:
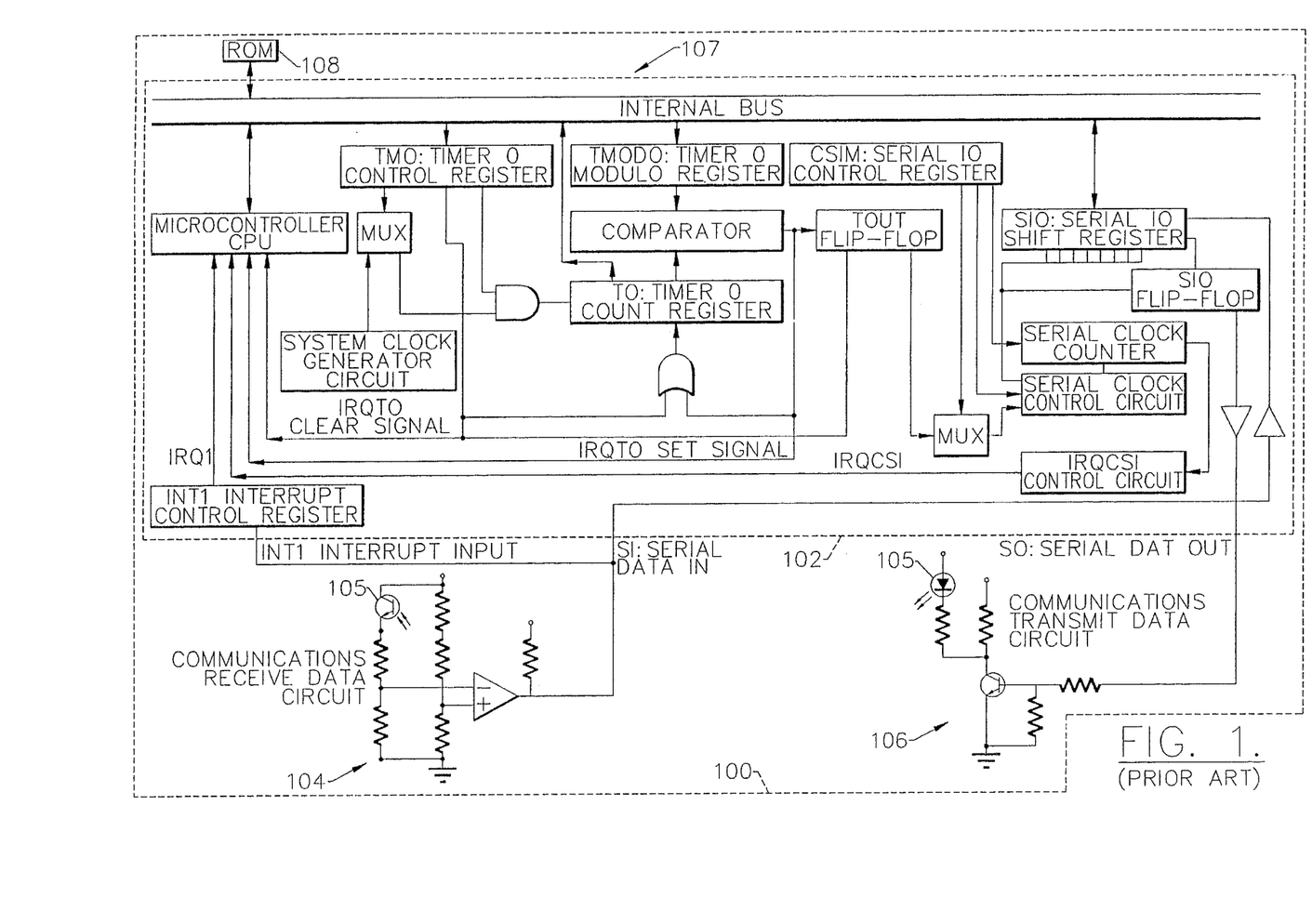
FIG. 1 is a circuit schematic diagram of the NEC 7530X microcontroller configured for serial, synchronous communications.

FIG. 1 is a circuit schematic diagram of a meter 100 containing a commercially available NEC 7530X microcontroller 102 configured for serial, synchronous communications. To operate asynchronously, the microcontroller 102 is coupled to receiving optics 104 and transmitting optics 106 which are connected at a port 105. Such optics are generally utilized in the utility meter industry for communicating with a meter register. Particularly, in an metering context, the microcontroller 102 and optics 104 and 106 form part of a meter register 107. Such registers are well known in the art and are commercially available, such as General Electric Company's Phase3 register. Additional details regarding the microcontroller are set forth in the NEC uPD7530x/31x User's Manual available from NEC Electronics Inc., One Natick Executive Park, Natick, Mass. 01769.

The present invention, for example, would be embodied in firmware stored in ROM 108 and coupled to the INTERNAL BUS for controlling the elements of the microcontroller 102. The circuit schematic diagram is provided merely as a reference and as a context for implementation which will be referred to when describing the present invention.

Figure 2:
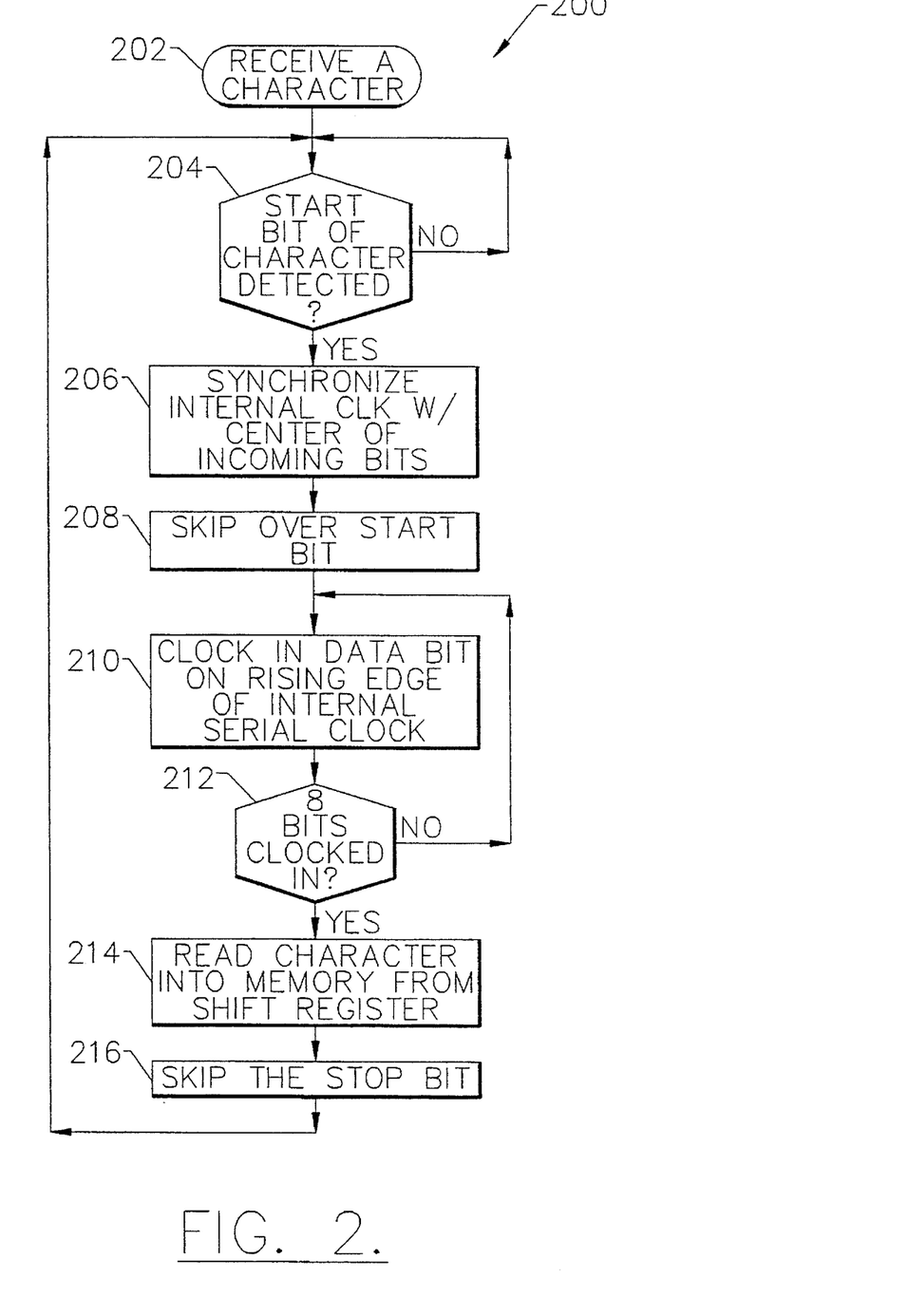
FIG. 2 is a flow diagram of one embodiment of the present invention that can be utilized to control the microcontroller shown in FIG. 1 so as to receive data in a serial, asynchronous manner.

Referring now to FIG. 2, the receive mode of operation for the present algorithm is described in flow chart 200. Specifically, when in the receive mode (202), the first step is to detect a start bit (204). If no start bit is detected, the microcontroller 102 simply continues to check for a start bit. If a start bit is detected, then the internal clock of the microcontroller 102 (represented in the SYSTEM CLOCK GENERATOR CIRCUIT block in FIG. 1) is synchronized with the center of incoming bits (206). The start bit is then skipped over (208) and the data bit is "clocked in" on the rising edge of the internal serial clock (210). If all eight (8) bits of a character are not yet clocked in (212), then the next data bit is clocked in on the rising edge of the internal serial clock (210). The term "clocked in" means that the bit is disposed in the shift register which is represented in the block labelled SIO: SERIAL IO SHIFT REGISTER in FIG. 1. Operations continue until all eight (8) bits are clocked in (212), and then the character is read from the shift register into a memory location (214). The stop bit is skipped (216) and operations return to monitoring whether the start bit of another character has been detected (204).

Figure 3:
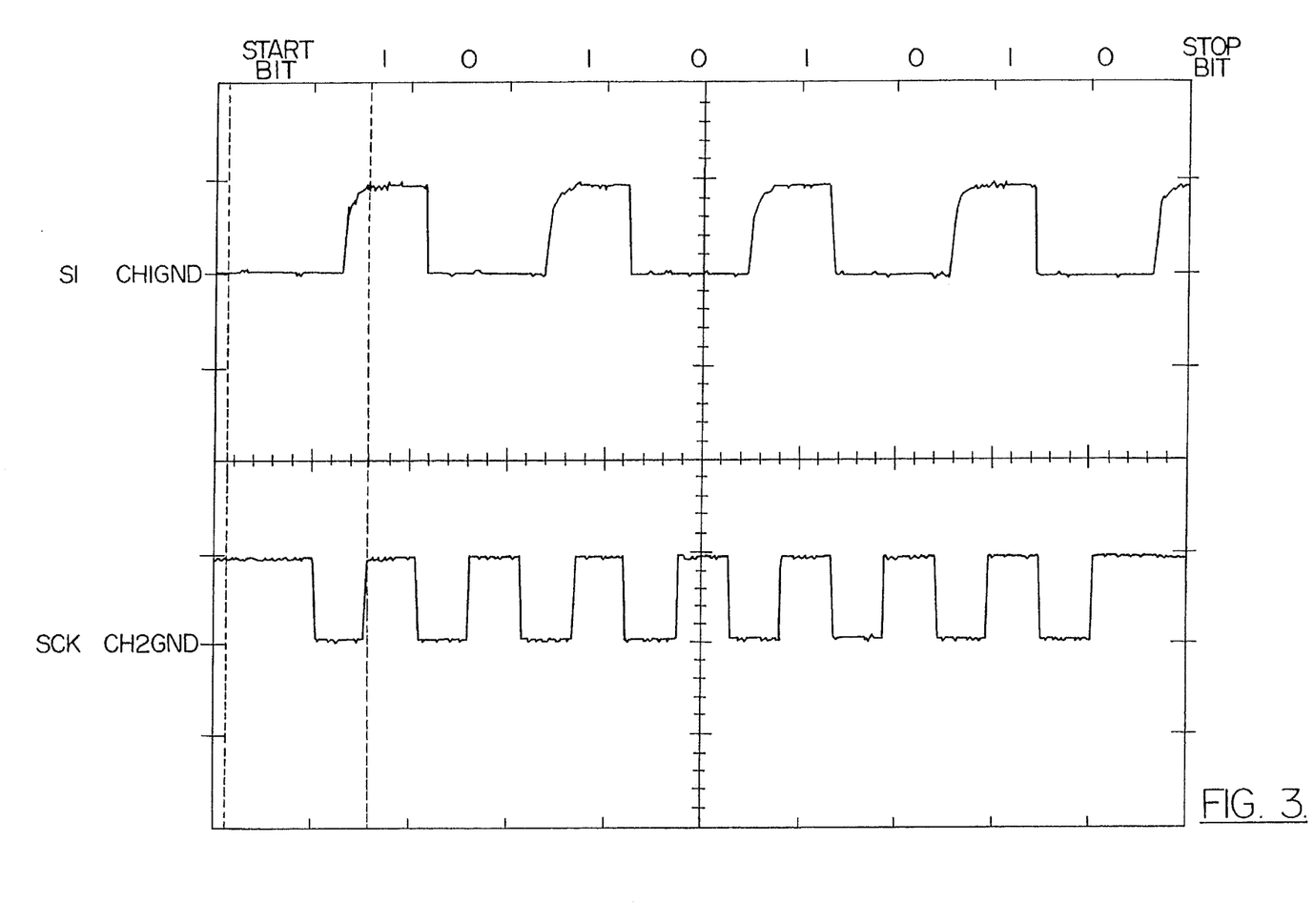
FIG. 3 is a timing diagram for the algorithm illustrated in FIG. 2.

The receipt of the data bits of a character can easily be seen in the timing diagram set forth in FIG. 3 wherein subsequent to receipt of the START BIT, a "1" is received by detecting the state of CH1 on the rising edge of the CH2 clock signal. The subsequent data bits are received in a similar manner. Once all eight (8) bits are detected, the stop bit is received and the microcontroller 102 returns to its monitoring state by returning the clock to a normally high state.

Figure 4:
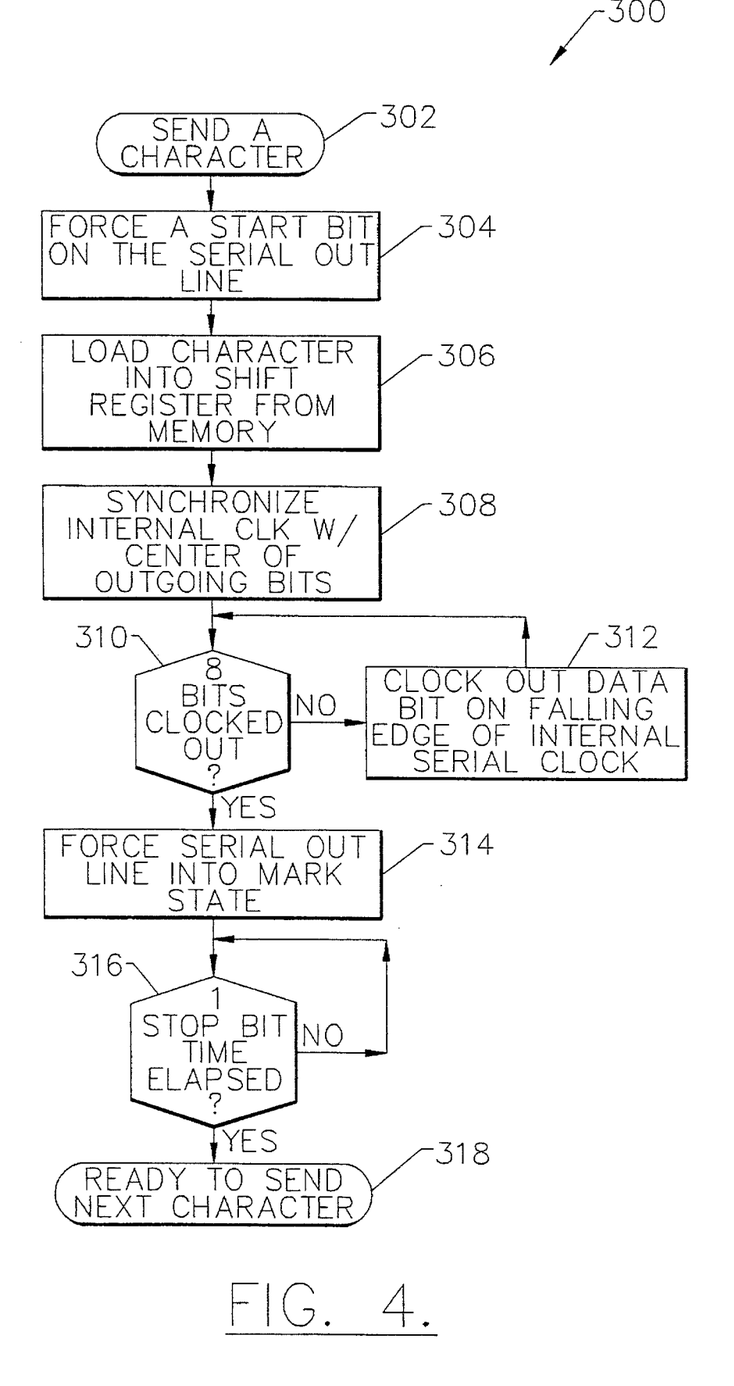
FIG. 4 is a flow diagram of one embodiment of the present invention that can be utilized to control the microcontroller shown in FIG. 1 so as to transmit data in a serial, asynchronous manner.

Referring now to FIG. 4, the transmit mode of operation for the present algorithm is described in flow chart 300. Specifically, when in the transmit mode (302), the microcontroller 102 places a start bit (304) on the serial out line (represented as the SO: SERIAL DAT OUT line in FIG. 1). A character is then placed into the shift register from memory (306) and the internal clock is synchronized with the center of the outgoing bit (308). If eight (8) bits have not been clocked out (310), then the next data bit is clocked out on the falling edge of the internal serial clock (312). Once eight (8) bits have been clocked out (310) then the serial out line is placed in a mark state (314). After one bit time has elapsed (316), then the microcontroller 102 is ready to send the next character (318).

Figure 5:
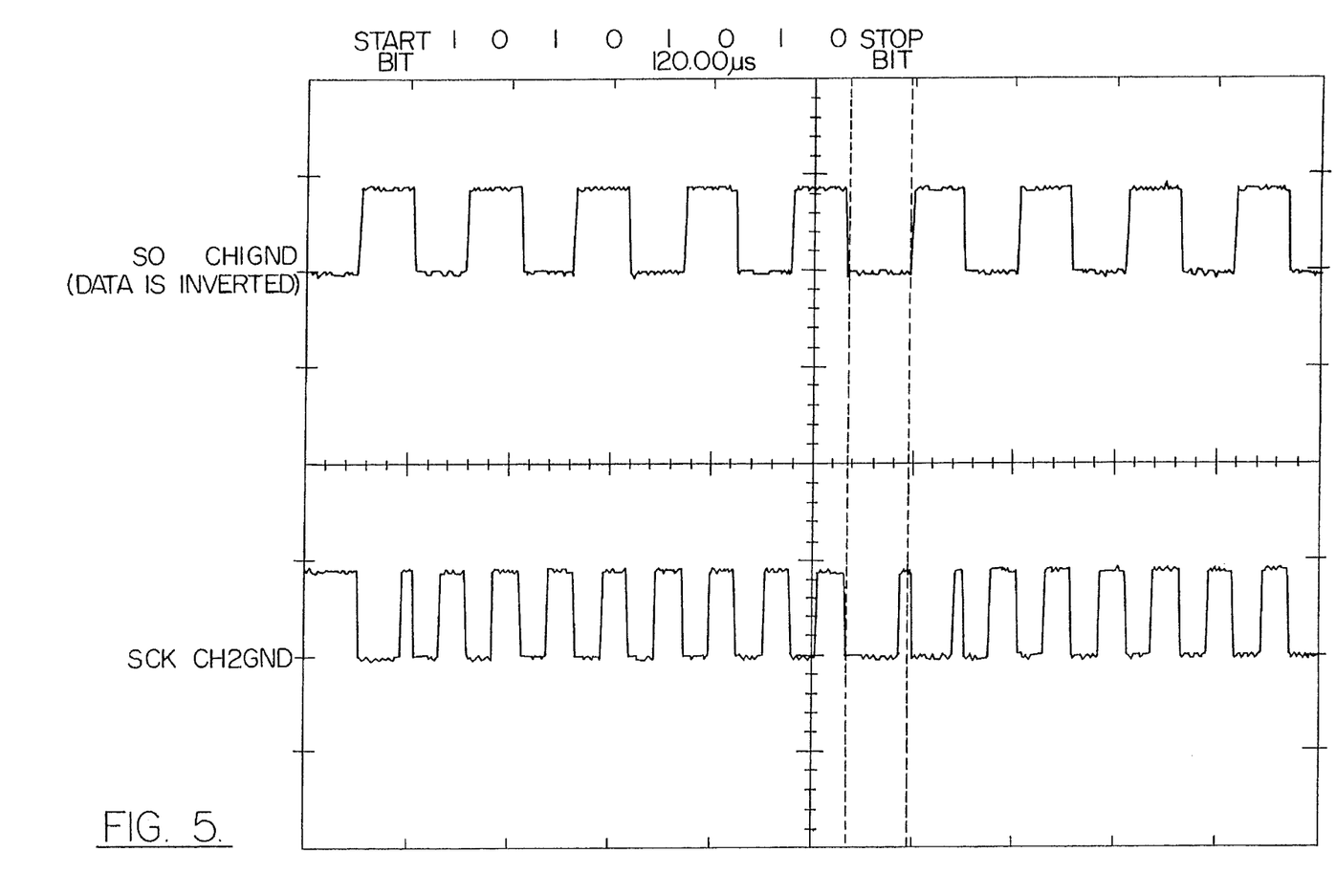
FIG. 5 is a timing diagram for the algorithm illustrated in FIG. 4.

The transmission of the data bits of a character can easily be seen in the timing diagram set forth in FIG. 5 wherein subsequent to the start bit and after forcing the serial data put line high, transmission on CH1 of the next data bit occurs on the falling edge of the of the CH2 clock signal. The subsequent data bits are transmitted in a similar manner. Once all eight (8) bits are transmitted, the stop bit is skipped and the microcontroller 102 waits for one bit elapsed time before transmitting the next character.

The foregoing description regarding transmission and receipt of a character relates to serial, asynchronous communication of eight (8) bit characters. It should be understood, of course, that more than eight (8) bit or less than eight (8) bit characters could be utilized.

The present invention provides a 9600 BPS communication rate and does not substantially limit the amount of other processing that can be performed by the microcontroller during communication. Moreover, and as described above, the present invention saves the utilities the added cost of having to purchase a UART.

FIGS. 6A–E are more detailed flow diagrams of one embodiment of the present algorithm. The flow charts are sufficiently detailed to enable one skilled in the art to implement the present invention in the NEC microcontroller illustrated in FIG. 1. The present invention, of course, is not limited to such microcontroller. Moreover, the flow charts shown in FIGS. 6A–E will be readily understood by those skilled in the art and therefore, step-by-step additional explanation of such charts is unnecessary.

Timing constants for the algorithm are set forth below in Table 1.

TABLE 1

| NAME | VALUE (COUNTS) | VALUE (MICRO SEC.) | TIMER CONSTANT |
| --- | --- | --- | --- |
| BITTC | 0DH | 49.6 | CLOCKING DATA BITS |
| SKIPTC | 0FH | 57.3 | SKIPPING RECEIVED START BIT |
| STARTTC | 16H | 84.0 | SENDING START BIT |
| STOPTC | 1BH | 103.1 | SENDING STOP BIT |

Figure 6A:
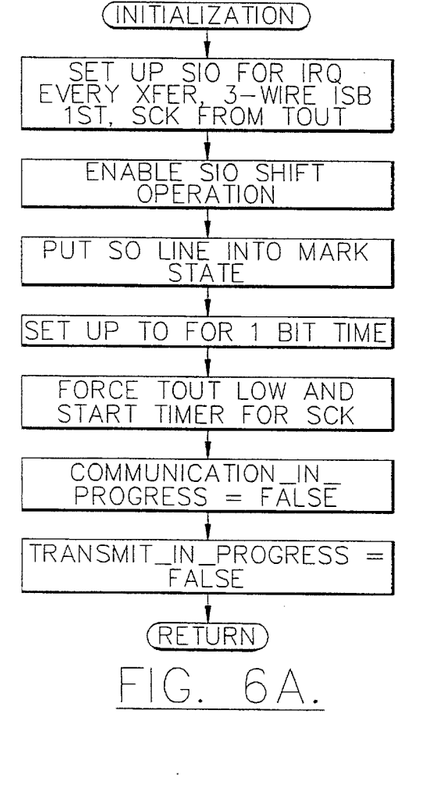
FIGS. 6A–6E are more detailed flow diagrams of the present algorithm.

Referring to FIG. 6A, an initialization routine which sets up the hardware of the microcontroller 102 is set forth. The routine also sets the control flags for the interrupts used in serial communications.

Figure 6B:
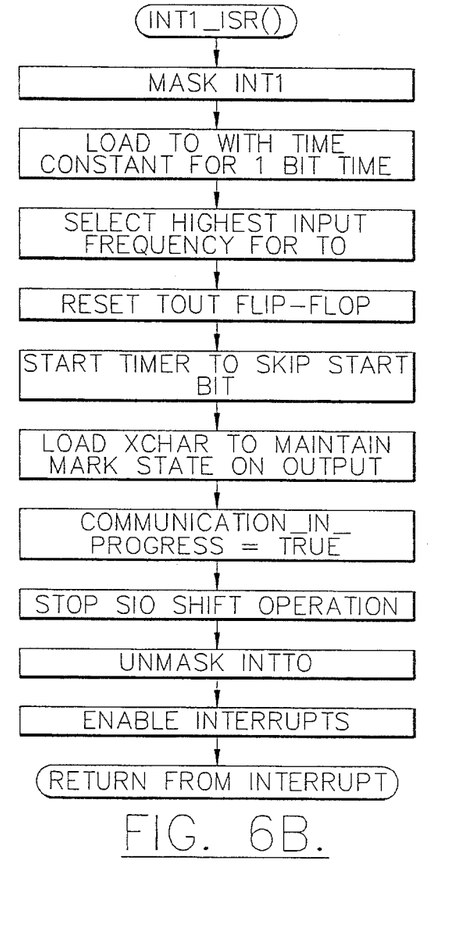

FIG. 6B is a flow diagram for an intl__isr routine. This is the interrupt service routine for the INT1 interrupt line. The INT1 input line is coupled to the SI serial data input line of the microcontroller 102. The input from the optics 104 to the SI serial input line will have a low input value for logic state 0 and a high input value for a logic state 1. Between input bytes, the SI line will have a high input state, which is called the mark condition. The optics output, however, has no inverter. The SO line, therefore, must produce a high output state for logical 0 and a low output state for a logical 1. When there are no bytes being sent, the SO must output a low state to create the mark condition for the receiving R/P. All output bytes must be bitwise inverted before being sent. Input bytes can be directly read with no processing.

INT1 occurs when the start bit of an incoming serial character is detected. The SIO clocks data in on the rising edge of the SCK, and the SIO needs to have the SCK high at the time the shift operation is enabled. Since the start bit is skipped, when the falling edge of the start bit is detected, the TOUT flip-flop, which is the source of the SCK, is reset.

The INT1 interrupt then is disabled and the INTT0 interrupt is enabled. When the TOUT flip-flop is reset the SCK will go low. The timer T0 is set to a time equal to one bit length so that when the start bit has been skipped, the TOUT flip-flop will go high. At this time an INTT0 interrupt will also be generated.

Figure 6C:
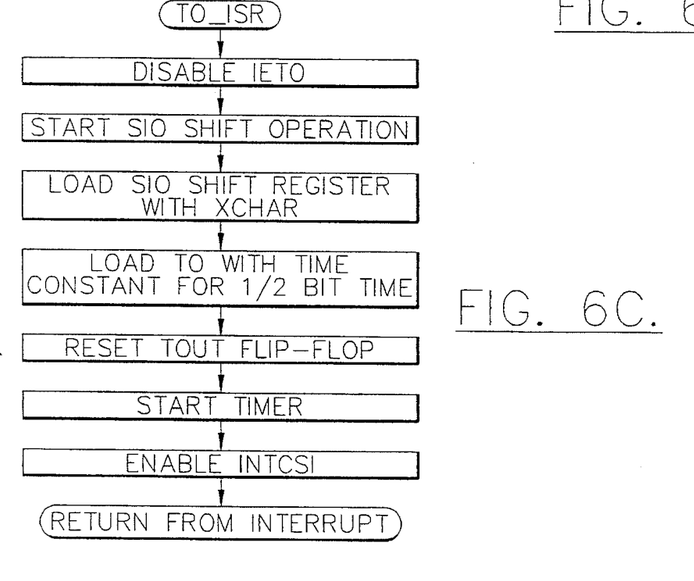

Referring to FIG. 6C, the T0_isr routine is shown. This routine is the interrupt service routine for the INTT0 interrupt. When the INTT0 interrupt occurs, the leading edge of the least significant data bit of the serial data input byte will be present at the SI input. A 00H (the optic driver has no inverter) is placed in the SIO shift register since data is shifted out on the opposite edge of the same clock used to shift data in. Shifting out a 00H ensures that the SO serial data output line maintains a marking state at the optics output. The INTT0 interrupt is disabled and the SIO interrupt is enabled.

The shift operation is enabled at this point, since the SCK line will be high. The T0 timer is then set to a time of one-half of one bit length and the TOUT flip-flop is reset. The TOUT flip-flop / SCK will go low, and the first bit of the 00H will be shifted out, keeping the output line low, but the optics output in the mark state.

When one-half bit time expires, the middle of the least significant data bit of the serial data input byte will be present at the SI input, the TOUT flip-flop will go high, and the first bit of the serial data byte will be clocked into the SIO shift register on the rising edge of the SCK from the TOUT flip-flop. The INTT0 interrupt no longer occurs so the process of clocking the 00H out on the falling edge of the SCK, and clocking in data on the rising edge of the SCK, continues until all eight (8) bits have been shifted.

Since TOUT is a flip-flop, each time the timer expires (one-half bit time) the SCK will change state. Thus, the complete waveform has a period of one bit time. With a 4.19 MHz crystal, it is not possible to have a time constant that is exactly one-half bit time at 9600 bps. The time constant is slightly less. The exact point of sampling the incoming bits, therefore, will be slightly beyond the middle for the first bit due to the added time of executing the instructions. Since the time constant is slightly less than one-half bit, the sampling point will become slightly earlier for each successive bit in the byte so that the sampling point of the last bit is slightly before the mid-point of the bit. The total error, however, is less than 10% of the bit time, which is within acceptable limits. Specifically, the time constant is calculated to provide a sampling point beyond the worst case rise time region of the detecting optics 104.

This routine (T0_isr routine) provides concurrent data transmission and other microcontroller operations. Particularly, the interrupt routine executes the same instructions for receiving and transmitting data. Therefore, repetitive interrupt-driven transmission of characters is possible. Importantly, in the T0_isr routine, there are no logic decisions. The microcontroller 102, therefore, simply loads the character to be transmitted (i.e., xchar) into the shift register and can return to performing other operations.

Figure 6D:
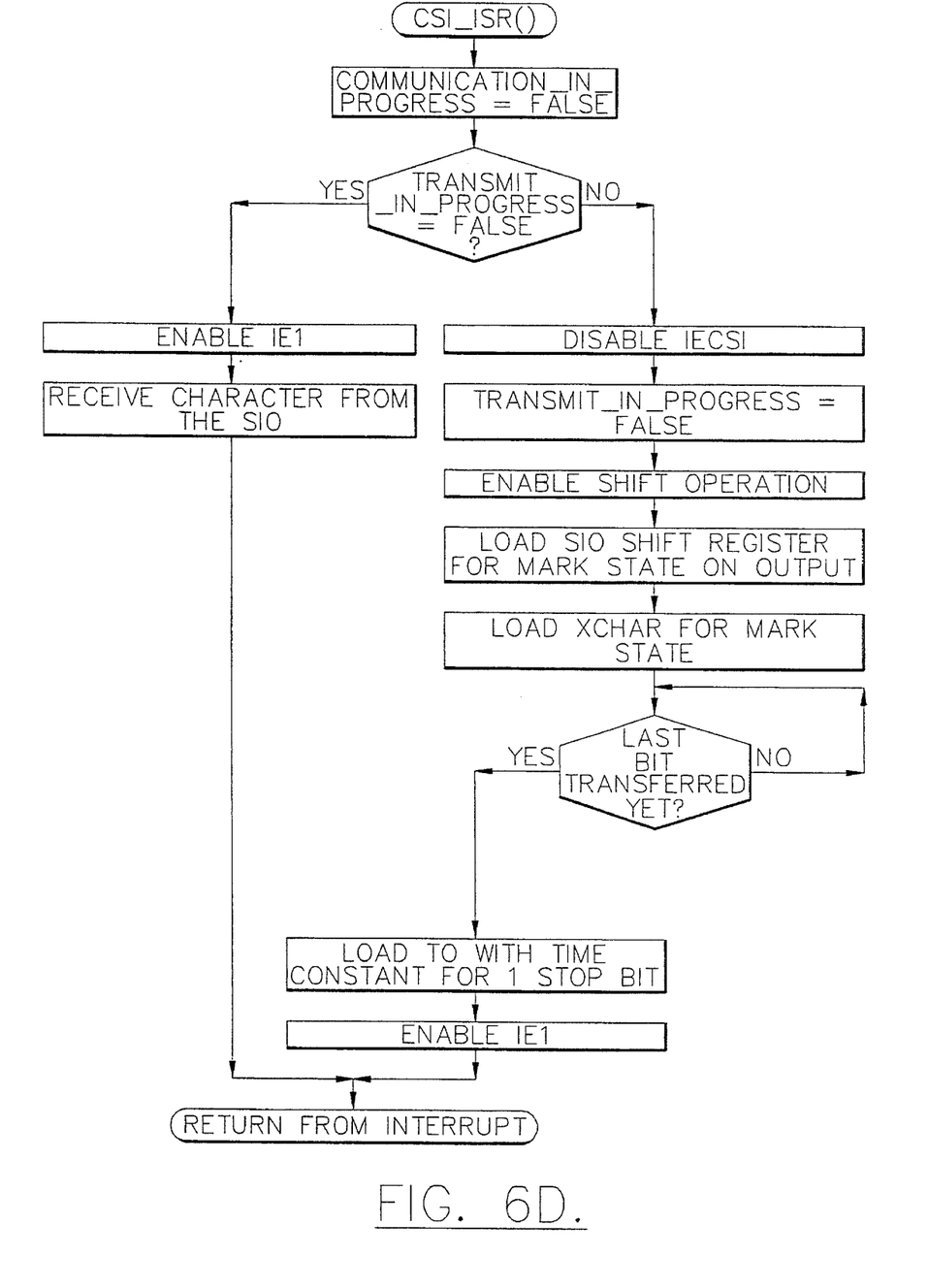

FIG. 6D illustrates the csi_isr routine. This routine is an interrupt service routine for the INTCSI interrupt. The INTCSI interrupt occurs every time a shift operation occurs in conjunction with the SCK clock edge causing the shift of the last bit. The CSI interrupt for shifting in an input character is the same as the shifting out an output character. Determination of which operation was intended must be made and care must be taken to insert at least one stop bit before shifting out the next output byte if a transmit operation is underway.

Figure 6E:
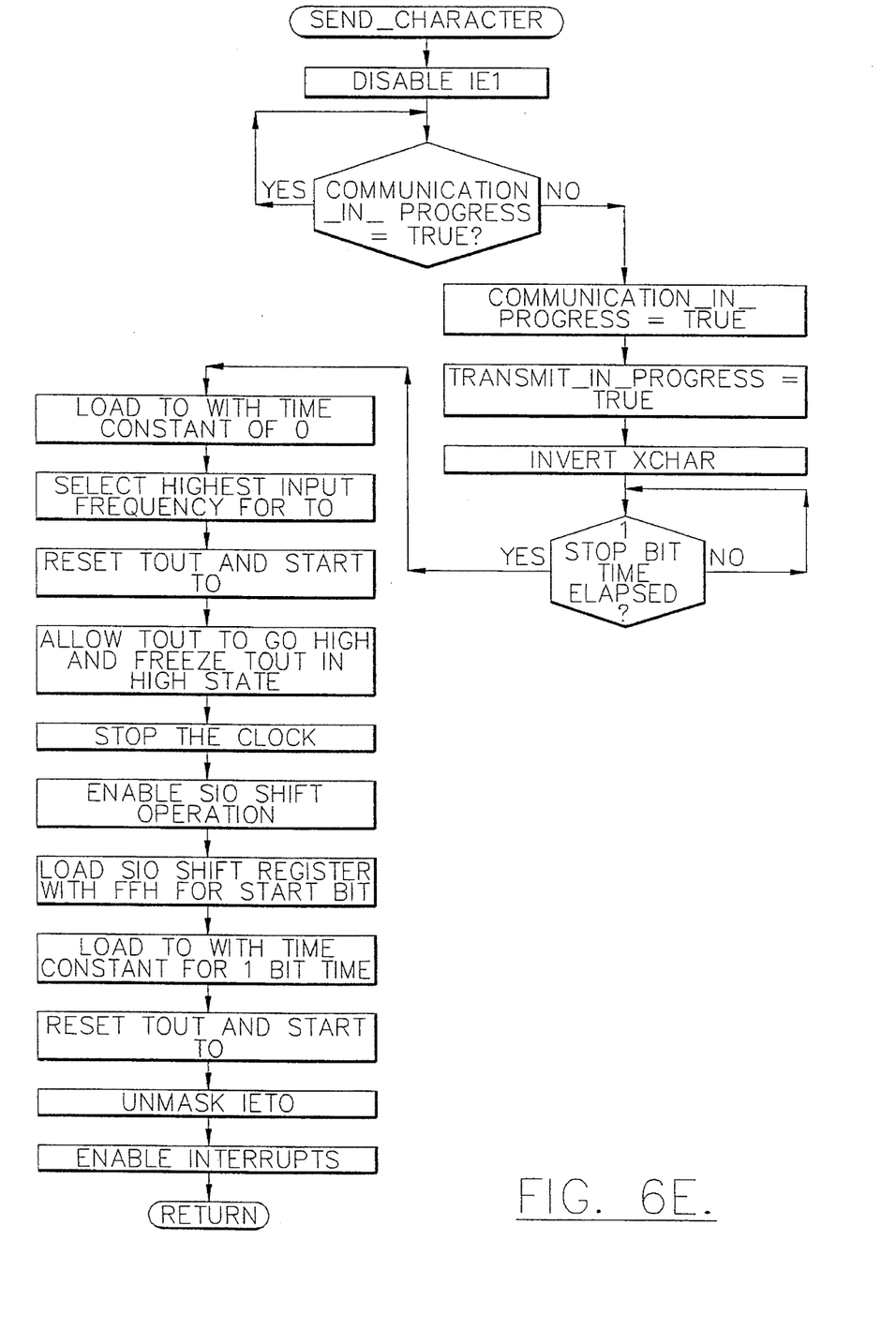

FIG. 6E illustrates the send_character routine. This routine sends a character out the serial communication channel. Particularly, a character to be transmitted is passed in as the input parameter. When sending characters, a start bit must be forced out the SO output port before sending the data character. One advantage to using this approach is that it allows the to_isr routine to be used for both sending and receiving characters without any additional logic. The send_character routing completes the character transmission using the T0 and CSI interrupts. Thus, background processing can occur while the character is being shifted out. If the T0 or CSI interrupts must be masked by the background processing, use of a wait loop rather than interrupts would reduce the probability of framing errors for the transmitted character.

Note also that this routine inverts the xchar (i.e., the character to be transmitted). This inversion provides that a "1" bit is represented by a low, i.e., no, pulse and a "0" bit is represented by a high optic pulse. Since the mark state is a logical "1", this inversion prevents the transmitting optics 106 from being in an "on" condition when the microcontroller 102 is in the mark state. Further details regarding optical communication are set forth in GE's OPTOCOM—2 PROTOCOL Document available from General Electric Company, 130 Main Street, Somersworth, N.H. 03878.

With respect to the present invention, synchronization of the sampling clock is critical in establishing error free communication at 9600 BPS. If the synchronization is not exact, the sample for a bit state can occur in the signal transition zone or even during the wrong bit period. Such circumstances, of course, can result in bit errors in the data.

Since bits 1 and 7 are clocked in automatically following bit 0, bit 0 must be synchronized with the data clock (SCK). Data is clocked in on the rising edge of the SCK signal. Therefore, the SCK signal should transition from low to high at the center of the first data bit. The SCK signal is obtained from the TOUT flip/flop. The timer for TOUT is fed from the free-running main crystal oscillator, and the TOUT signal changes state whenever the timer has counted down to 0 from its pre-loaded time constant.

In the microcontroller used for meter register applications there is no direct means available to force a low to high transition on command for the SCK signal. Allowed operations are: load constant, start timer, and stop timer. The instruction execution clock, however, is fed from the same main crystal oscillator as the timer. The instruction execution clock, therefore, is used to provide timer synchronization.

The timer is loaded with a constant that corresponds exactly to the number of clock cycles required to load and start operations. Exactly at the time the instructions have been completed, the timer will be in the required state—just as though a command to directly control the timer was available. The clock is synchronized for output data in a similar fashion, although output data is clocked on the opposite edge. Set-up speed between output bytes is not as critical as for input data, since the output rate is also controlled whereas the input data rate is determined by the sending system.

Some differences between the present invention and the method described in the NEC Electronics Inc.'s uPD75104/ 75106 Application Note 11, April 1987 are:

1. A critical operation is forcing the TOUT flip-flop low. The present algorithm sets the timer frequency to its maximum. The duration of the next set-up operation will match exactly the time required for the output to go high, thereby accomplishing the operation in an efficient manner for the NEC uPD75312 microcontroller.

2. The timing constants in the present invention are adjusted to compensate for instruction execution time, interrupt service latency, and the minimum to maximum time that the interrupts will be disabled. The SCK frequency cannot be programmed to an exact match for a 9600 baud rate, so the clocking has a small error for the first bit, approaches zero error for the middle bit, and grows to only a small error for the last bit. The timing constants prevent sampling in the region of rise time for the optic detector 104.

3. The service routine of the present invention for the TO interrupt allows the sending of characters to be efficiently interrupt-driven if required.

4. In the present invention, the data is inverted to reduce external hardware costs.

While the present invention has been described with respect to specific embodiments, many modifications, variations, substitutions, and equivalents will be apparent to those skilled in the art. Accordingly, the invention is to be considered as limited only by the spirit and scope of the appended claims.

What is claimed is:

1. In an electrical energy meter of the type containing a serial input/output port, a microprocessor-controlled electronic register containing memory and an execution clock therein for controlling register operations, a serial receiver and transmitter, connected between the electronic register and the serial input/output port, and a main crystal oscillator, a method of serially processing a string of binary input characters asynchronously received at a first data rate at the serial input/output port and transferred by the serial receiver to the electronic register, comprising the steps of:

detecting receipt of a first of the string of binary input characters at the serial input/output port of said electrical energy meter;

sampling the detected first binary input character by generating a first sampling clock signal internal to the electronic register of said electrical energy meter which is phase-synchronized with a least significant bit of the detected first binary input character, but has a frequency unequal to the first data rate;

detecting receipt of a second of the string of binary input characters at the serial input/output port; and sampling the detected second binary input character by generating a second sampling clock signal internal to the electronic register which is phase-synchronized with the least significant bit of the detected second binary input character and has a frequency equal to the frequency of the first sampling clock signal.

2. The method of claim 1, wherein said first binary input character sampling step comprises the step of sampling the detected first binary input character by generating a first sampling clock signal internal to the electronic register of said electrical energy meter which is phase-synchronized with a center of a least significant bit of the detected first binary input character.

3. The method of claim 1, wherein a frequency of the main crystal oscillator is unequal to an integer multiple of the first data rate.

4. The method of claim 3, wherein a frequency of the instruction execution clock equals an integer multiple of the frequency of the first sampling clock signal.

5. The method of claim 3, wherein the first sampling clock signal and the second sampling clock signal are out of phase relative to each other.

6. The method of claim 1, wherein the first data rate is 9600 bits/sec and the frequency of the first sampling clock signal is between 9600 bits/sec and 9728 bits/sec so that the phase synchronization between the first sampling clock signal and a most significant bit of the detected first binary input character is within 10 percent of the width of the most significant bit.

7. The method of claim 6, wherein said first and second binary input character sampling steps respectively comprise the steps of writing the first and second binary input characters to the memory.

\* \* \* \* \*